US012710811B2

(12) United States Patent
Caarls et al.

(10) Patent No.: US 12,710,811 B2
(45) Date of Patent: Aug. 18, 2026

(54) LATENCY REDUCTION IN AN EYE TRACKER OF AN AUTOSTEREOSCOPIC DISPLAY DEVICE

(71) Applicant: Dimenco Holding B.V., Veldhoven (NL)

(72) Inventors: Jurjen Caarls, Eindhoven (NL); Pieter Wilhelmus Theodorus de Jong, Hertogenbosch (NL)

(73) Assignee: Dimenco Holding B.V., Veldhoven (NL)

(*) Notice: Subject to any disclaimer, the term of this patent is extended or adjusted under 35 U.S.C. 154(b) by 0 days.

(21) Appl. No.: 18/861,049

(22) PCT Filed: Apr. 26, 2023

(86) PCT No.: PCT/NL2023/050223
§ 371 (c)(1),
(2) Date: Oct. 28, 2024

(87) PCT Pub. No.: WO2023/211273
PCT Pub. Date: Nov. 2, 2023

(65) Prior Publication Data

US 2025/0348132 A1 Nov. 13, 2025

(30) Foreign Application Priority Data

Apr. 29, 2022 (NL) ...................................... 2031747

(51) Int. Cl.
*G06F 3/01* (2006.01)
*G06T 7/246* (2017.01)
*G06T 7/277* (2017.01)

(52) U.S. Cl.
CPC .............. *G06F 3/012* (2013.01); *G06F 3/013* (2013.01); *G06T 7/246* (2017.01); *G06T 7/277* (2017.01); *G06T 2207/30201* (2013.01)

(58) Field of Classification Search
CPC . G06F 3/012; G06F 3/013; G06F 3/11; G06T 7/246; G06T 7/277;
(Continued)

(56) References Cited

U.S. PATENT DOCUMENTS

2003/0002705 A1* 1/2003 Boesen ................ H04R 1/1016 381/328
2013/0181892 A1* 7/2013 Liimatainen ............ G06F 3/013 345/156
(Continued)

FOREIGN PATENT DOCUMENTS

CN 119110933 12/2024
EP 2259598 12/2010
(Continued)

OTHER PUBLICATIONS

"International Application Serial No. PCT/NL2023/050223, International Search Report mailed Jul. 4, 2023", 4 pgs.
(Continued)

*Primary Examiner* — Mihir K Rayan
(74) *Attorney, Agent, or Firm* — Schwegman, Lundberg & Woessner, P.A.

(57) ABSTRACT

The invention relates to a method for tracking a facial characteristic of a viewer of an autostereoscopic display device, the method comprising obtaining first sequential data on the position of the facial characteristic relative to the autostereoscopic display device; and comprising second sequential data on the speed and/or acceleration of the facial characteristic relative to the autostereoscopic display device. The first sequential data are obtained at a first latency and the second sequential data are obtained at a second latency that is lower than the first latency. As a final step, sensor fusion is performed to combine the first sequential data and the second sequential data to generate final sequential data on the position of the facial characteristic relative to the autos- (Continued)

tereoscopic display device. In this way, the final sequential data are available at a final latency that is lower than the first latency. A viewer of an autostereoscopic display device can so be presented with an improved stereoscopic image and/or have an improved virtual reality experience, when he moves and rotates his head relative to the autostereoscopic display device.

20 Claims, 2 Drawing Sheets

(58) Field of Classification Search
CPC ........... G06T 2207/30201; G02B 2207/30201; G02B 27/0093; H04N 13/302; H04N 13/366; G01P 15/00; G06V 40/16
See application file for complete search history.

(56) References Cited

U.S. PATENT DOCUMENTS

| | | | | |
|---|---|---|---|---|
| 2016/0103484 | A1 * | 4/2016 | Guo | A61B 3/113<br>345/156 |
| 2016/0364904 | A1 * | 12/2016 | Parker | G06F 3/038 |
| 2018/0068449 | A1 * | 3/2018 | Malaika | G06V 40/19 |
| 2018/0129112 | A1 * | 5/2018 | Osterhout | G02F 1/153 |
| 2018/0300897 | A1 | 10/2018 | Woods et al. | |
| 2019/0113966 | A1 * | 4/2019 | Connellan | G01C 21/1656 |
| 2021/0345923 | A1 * | 11/2021 | Fogelström | A61B 5/18 |
| 2023/0011082 | A1 * | 1/2023 | Erivantcev | H04W 84/18 |

FOREIGN PATENT DOCUMENTS

| | | | |
|---|---|---|---|
| EP | 3287975 | | 2/2018 |
| EP | 3821792 | A1 | 5/2021 |
| EP | 4515359 | | 3/2025 |
| TW | 201106016 | | 2/2011 |
| TW | 201807995 | | 3/2018 |
| TW | 1877656 | | 3/2025 |
| WO | WO-2023211273 | A1 | 11/2023 |

OTHER PUBLICATIONS

"International Application Serial No. PCT/NL2023/050223, Written Opinion mailed Jul. 4, 2023", 6 pgs.

"Taiwanese Application Serial No. 112122432, Office Action mailed Apr. 8, 2024", W English Translation, 12 pgs.

"International Application Serial No. PCT NL2023 050223, International Preliminary Report on Patentability mailed Nov. 7, 2024", 8 pgs.

"European Application Serial No. 23720395.5, Noting of loss of rights pursuant to Rule 1121 EPC mailed Jun. 25, 2025", 2 pgs.

"European Application Serial No. 23720395.5, Response to Communication pursuant to Rules 1611 and 162 EPC filed Jun. 5, 2025", 19 pgs.

* cited by examiner

LATENCY REDUCTION IN AN EYE TRACKER OF AN AUTOSTEREOSCOPIC DISPLAY DEVICE

CROSS-REFERENCE TO RELATED APPLICATION

This application is a U.S. National Stage Filing under 35 U.S.C. 371 from International Application No. PCT/NL2023/050223, filed on Apr. 26, 2023, and published as WO 2023/211273, which claims priority to Netherlands Patent Application No. 2031747, filed Apr. 29, 2022, each of which applications are incorporated herein by reference in their entirety.

FIELD OF THE INVENTION

The invention relates to a method for tracking a facial characteristic of a viewer of an autostereoscopic display device, to a tracking system for tracking a facial characteristic of a viewer of an autostereoscopic display device, and to an autostereoscopic display device comprising such tracking system.

BACKGROUND

An eye tracker is a device for measuring real-time eye position and real-time eye movement of a person. It typically captures an image of the eye using a photodiode or a camera. Identification of the eye then typically occurs by facial landmark detection, followed by using signal or image processing methods to estimate a motion of the eye.

An important application of eye trackers concerns their use in input devices for human-computer interaction. For example, in autostereoscopic display systems they provide the real-time position of the viewer's eyes, so that a realistic three-dimensional image can be perceived by the viewer, also when the viewer moves relative to the display. This occurs by providing his/her left eye exclusively with a left eye image and his/her right eye exclusively with a right eye image. Additionally, eye position may be used to adapt a perspective view of a three-dimensional scene to the position of the viewer's head/eyes relative to the display (the so-called "look-around effect").

Just as virtually any electronic measurement device, an autostereoscopic display system suffers from latency, which is commonly understood as a time delay between user input and system response. In the setting of an autostereoscopic display system, this basically means that there is a delay between the movement of the viewer's head/eye (user input) and the adaptations to the displayed content in response thereto (system response). If latency exceeds a critical threshold, user performance and experience get impaired. This usually concerns crosstalk and a disturbed look around effect.

For a significant part of the latency observed in autostereoscopic displays, the eye tracker can be held responsible. For example, a typical 85 ms total system latency may contain 43 ms of eye tracker latency. It would thus be a step forward to combat latency by only reducing the latency that finds its origin in the eye tracker.

SUMMARY OF THE INVENTION

It is therefore an object of the invention to reduce the latency that develops in an eye tracker. It is more generally an object of the present invention to improve the viewing experience of a viewer of an autostereoscopic display.

It has now been found that one or more of these objects can be reached by using an additional measuring means.

Accordingly, the present invention relates to a method for tracking a facial characteristic of a viewer of an autostereoscopic display device, the method comprising obtaining first sequential data on the position of the facial characteristic relative to the autostereoscopic display device, wherein the first sequential data are obtained at a first latency, wherein the method further comprises

- obtaining second sequential data on the speed and/or acceleration of the facial characteristic relative to the autostereoscopic display device, wherein the second sequential data are obtained at a second latency, the second latency being lower than the first latency;
- performing sensor fusion to combine the first sequential data and the second sequential data to generate final sequential data on the position of the facial characteristic relative to the autostereoscopic display device, wherein the final sequential data are available at a final latency that is lower than the first latency.

The present invention further relates to a tracking system for tracking a facial characteristic of a viewer of an autostereoscopic display device, the tracking system comprising

- a tracking camera system configured to obtain first sequential data on the position of the facial characteristic relative to the autostereoscopic display device, wherein the first sequential data are obtained at a first latency;
- a secondary tracking system configured to obtain second sequential data on the speed and/or acceleration of the facial characteristic relative to the autostereoscopic display device, wherein the second sequential data are obtained at a second latency, the second latency being lower than the first latency;
- a sensor fusion module that is configured to combine the first sequential data and the second sequential data to generate final sequential data on the position of the facial characteristic relative to the autostereoscopic display device.

The present invention further relates to an autostereoscopic display device comprising a tracking system as described above.

DETAILED DESCRIPTION OF THE INVENTION

Figure 1:
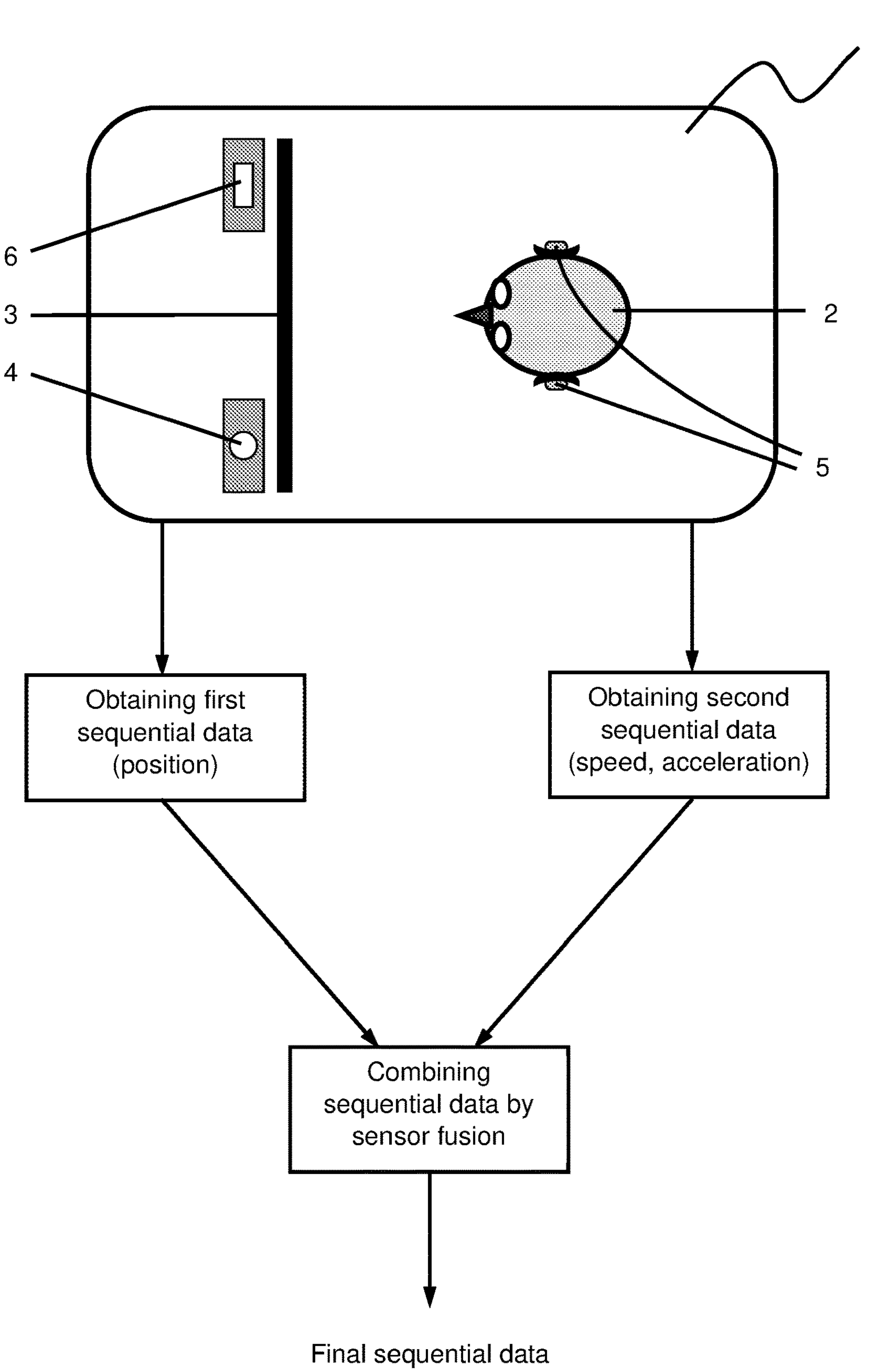
FIG. 1 displays an exemplary flow diagram of a method according to the invention.

Elements in the figure are illustrated for simplicity and clarity and have not necessarily been drawn to scale. For example, the dimensions of some of the elements in the figure may be exaggerated relative to other elements to help improve understanding of various exemplary embodiments of the present invention. In particular, the relative dimensions of a viewer and an autostereoscopic display device cannot be derived from the figures.

Further, the terms "first", "second", and the like in the present description and claims, if any, are generally used for distinguishing between similar elements and not necessarily for describing a sequential or chronological order.

In the context of the invention, by the term 'viewer' is meant a person who can consume, in particular view, content presented by an autostereoscopic display device. Throughout the text, references to the viewer will be made by male words like 'he', 'him' or 'his'. This is only for the purpose of clarity and conciseness, and it is understood that female words like 'she', and 'her' equally apply.

In the context of the present invention, speed is meant to include linear speed and rotational speed; and acceleration is meant to include linear acceleration. Further, it is understood that position and orientation of an item (e.g. a device, body part or facial characteristic) can be derived from the speed and acceleration of the item and an initially known position and orientation of the item.

In the context of the present invention, by the tracking of a facial characteristic is meant the tracking of the position of the facial characteristic in time. The obtained position is related to the position of the tracking system that performs the tracking, and ultimately to the position of the autostereoscopic display device.

In the context of the present invention, by latency is meant a time delay between user input and system response, which is a consequence of the limited speed at which any physical interaction can propagate and information can be transferred.

In the context of the present invention, sequential data refers to data that contain elements that are ordered into sequences by time. This concerns the measuring of a quantity over time at certain time intervals (time series).

In conventional methods for tracking facial characteristics, such as the eyes, usually one or more cameras are used to obtain positional data on the facial characteristic and track its position. Such camera then has the head of the viewer in the observation field of the camera. In a method of the invention, this conventional tracking method is supplemented by a second tracking method that is based on the speed and/or acceleration rather than the position of the facial characteristic.

Therefore, in a method of the invention, at least two types of sequential data on the facial characteristic are captured. First sequential data are obtained on the position of the facial characteristic relative to the autostereoscopic display device, while second sequential data are obtained on the speed and/or acceleration of the facial characteristic relative to the autostereoscopic display device. So, the method of the invention requires that its relative speed and/or acceleration is used as input for determining the second sequential data. Finally, the first and second sequential data are combined using sensor fusion, to yield final sequential data on the position of the facial characteristic relative to the autostereoscopic display device. These final sequential data form the actual output data of a tracker (e.g. an eye tracker) wherein the method of the invention is carried out; and they form the input for the weaving of stereoscopic images and, if applicable, generating stereoscopic images having the correct perspective from the viewer's standpoint ('look around effect').

In a method of the invention, the facial characteristic is typically an eye (or two eyes). The facial characteristic may however also be a facial characteristic selected from the group of an eye, a nose, an ear, a head and a mouth.

The first sequential data are preferably obtained by using one or more cameras, according to conventional technology. These one or more cameras is/are typically configured to record a facial characteristic of a viewer in an observation field of the one or more cameras. This further typically involves recognizing the facial characteristic in an image recorded by the one or more cameras and determining its position in the image.

The second sequential data are usually obtained by using a dedicated measuring device that is capable of determining the speed and/or acceleration of the facial characteristic relative to the autostereoscopic display device. Such dedicated measuring device may comprise a wearable device that is worn on the viewer's head. For example, the wearable device is selected from the group of earbuds, headphones, glasses, headbands, tiaras, rubber bands and headgear. Such device is typically capable of determining its specific force (i.e. the force acting on it; acceleration). It may also be capable of determining its angular rate and/or its orientation. To this end, the dedicated measuring device is equipped with one or more accelerometers and usually also with one or more measuring instruments selected from the group of gyroscopes and magnetometers. In the art, a measuring device comprising these instruments is known as an inertial measurement unit (IMU). The speed of the dedicated measuring device may be derived from the measured accelerations, following an initial calibration wherein the speed of the autostereoscopic display device relative to the dedicated measuring device (such as a wearable on the head) is set at a particular value (typically zero).

A head-worn IMU preferably comprises accelerometers and gyroscopes, as this allows the IMU to discriminate between lateral and rotational movement of the head (especially rotations characterized as pitch and yaw). This is important for determining a head pose. A magnetometer is preferably also present in order to be able to discriminate between gravitational force and specific force.

It is understood that the data obtained by the wearable device are representative of the speed and/or acceleration of the wearable device and not necessarily of the facial characteristic, even in view of their fixed relative positioning (it is noted that when the wearable device is positioned exactly in or on the facial characteristic, this can be highly inconvenient, for example when the eyes are concerned). Especially in the case of rotation of the head, the speed and acceleration of the wearable device may deviate from those of the facial characteristic. Therefore, it is preferred that the relative positioning of the wearable device and the facial characteristic is known, so that the speed and/or acceleration of the facial characteristic itself can be obtained, relative to the autostereoscopic display device.

FIG. 1 displays an exemplary flow diagram of a method according to the invention, which starts in the upper part with a setting (1) wherein a viewer (2) is in front of an autostereoscopic display device (3). Associated with the autostereoscopic display device (3) are a tracking camera system (4), a secondary tracking system (5) and a sensor fusion module (6). The viewer (2) wears the tracking system (5) as earbuds. The lower part of the flow diagram shows that first sequential data and second sequential data are obtained separately from the setting (1). Herein, the tracking camera system (4) provides the first sequential data and the secondary tracking system (5) provides the second sequential data. Both sequential data are then combined by means of sensor fusion, performed by sensor fusion module (6), yielding final sequential data as output of the method.

In a method of the invention, the sequential data are obtained at a certain frequency, which will hereafter be indicated with the term 'sampling rate'. The first sequential data are typically obtained at a rate in the range of 10-100 Hz, in particular in the range of 25-75 Hz, such as 30 Hz, 40

Hz, 50 Hz or 60 Hz. The second sequential data are typically obtained at a sampling rate that is higher than that of the first sequential data, although it may also be lower. Preferably, of course, the sampling rate is as high as possible. The sampling rate of the second sequential data is for example in the range of 20-1.000 Hz, in particular in the range of 50-500 Hz. Especially an IMU is capable of measuring at high sampling rates, such as rates in the range of 100-1.000 Hz.

In some cases, the speed and/or acceleration of the autostereoscopic display device itself has to be taken into account when obtaining the second sequential data. In such case, the autostereoscopic display device is usually configured to produce third sequential data on its own speed and/or acceleration. This is typically the case when the autostereoscopic display device has no fixed position relative to Earth during use of the device, for example when the device is a handheld (mobile) device, such as a mobile phone, a tablet, a laptop or a game console. After all, absolute acceleration and speed of the facial characteristic alone as well as absolute acceleration and speed of the autostereoscopic display device alone need to be available in order to be able to obtain their relative speed and acceleration. Only when the autostereoscopic display device is truly stationary, then it is not necessary to take account of its own absolute acceleration. But when the viewer is in a car or on a boat that is moving, it is usually necessary to take account of the acceleration of the autostereoscopic display device, since a boat and a car are usually subject to accelerations when in use. In such situation, measuring the absolute acceleration of the autostereoscopic display device is usually preceded by an initial calibration wherein the speed of the autostereoscopic display device relative to the facial characteristic is set at a particular value (typically zero). Usually, in such initial calibration also the orientation of the autostereoscopic display device relative to the facial characteristic is set at a particular value. This may also concern an initial guess, e.g. based on initial camera images.

It is also possible that the dedicated measuring device is not worn on the viewer's head, but that it is a remote device that is positioned on a distance from the head (and, as a result, moves independent from the movement of the head). For example, the measuring principle of such remote device relies on the Doppler effect (in sound or light), on time of flight or on triangulation. To this end, the remote device may comprise a source of electromagnetic radiation that is capable of irradiating the head.

When the autostereoscopic display device and the remote device are not accelerating (i.e. stationary with respect to Earth or moving with a constant velocity with respect to Earth), then it is sufficient that the remote device measures the speed and/or acceleration of the facial characteristic relative to the remote device. This is for example the case when the autostereoscopic display device and the remote device are placed or mounted at a certain position in a room where the viewer views the autostereoscopic display device. The remote device may also form an integral part of the autostereoscopic display device.

When the autostereoscopic display device and/or the remote device accelerate, then it is necessary to compensate for such accelerations. This is typically done by measuring the accelerations of the autostereoscopic display device and/or the remote device. Such situation for example applies when the autostereoscopic display device is a handheld mobile device or when the viewer is present in a car or on a boat.

To this end, the remote device and/or the autostereoscopic display device is equipped with one or more accelerometers and usually also with one or more measuring instruments selected from the group of gyroscopes and magnetometers. Preferably, it is equipped with an IMU. The speed of the remote device relative to the autostereoscopic display device may be derived from the measured accelerations, following an initial calibration wherein the speed of the autostereoscopic display device relative to the remote device is set at a particular value (typically zero). Preferably, however, the remote device is integrated with such handheld device, so that accelerations of only the handheld device need to be determined.

When using a remote device (i.e. one that is not worn on the viewer's head), then it is however preferred that the autostereoscopic display device and the remote device are not accelerating (i.e. that they are stationary with respect to Earth), because it requires quite some processor capacity to account for their accelerations, which in addition should not be performed with much latency. A setting where this is realized is for example a room that is dedicated to providing viewers with a virtual reality experience at the highest possible comfort. This would include the absence of wearables on the head and the positioning of a plurality of remote devices that are stationary and accurately obtain the second sequential data. Also the autostereoscopic display device would be at a stationary position in the room.

Conventionally, tracking of facial characteristics (usually of the eyes) is based on capturing images with a camera forming part of a tracking system. The capturing itself results in latency (typically half of the shutter speed), which is augmented with latency resulting from the transfer and processing of the obtained frame. The present invention, however, provides a method that reduces the latency of the tracking system as a whole to a value that is lower than the latency that is caused by only the camera-based tracking.

In a method of the invention, the first sequential data are typically obtained via such camera-based tracking system, representing the position of the facial characteristic relative to the autostereoscopic display device. This occurs at a first latency. The second sequential data are obtained via different means. This occurs at a second latency.

The second sequential data are not position data but speed and/or acceleration data. These data can be used to make a prediction on the position of the facial characteristic in the near future. Therefore, in a method of the invention, the first and second sequential data are combined to yield final sequential data on the position of the facial characteristic relative to the autostereoscopic display device. These data form the actual output of a tracking system (e.g. an eye tracking system) wherein the method of the invention is carried out. This occurs at a final latency.

In a method if the invention, advantageously, the final latency proves lower than the first latency. In other words, by combining the first and second sequential data, the latency of the first sequential data is effectively decreased. And, advantageously, the latency of the tracker too. Thus, this method can advantageously be performed in a tracker of an autostereoscopic display device to yield an improved stereoscopic image, in particular an improved virtual reality experience to a viewer, when he moves and rotates his head relative to the autostereoscopic display device; and especially when the autostereoscopic display device is handheld and therefore subject to intense movement, in particular rotations.

In a method of the invention, the autostereoscopic display device may be selected from the group of televisions, (desktop) monitors, cinema display systems, mobile phones, tablets, laptops and game consoles.

The combination of the first sequential data and the second sequential data occurs via a so-called sensor fusion. This is a concept commonly known as the process of merging data from multiple sensors to thereby overcome the limitations of individual sensors. This produces more reliable information with less uncertainty.

In the present invention, the sensor fusion overcomes the problem of high latency of a first sensor by combining it with a second sensor that is less accurate but has a lower latency. Thus, such sensor fusion allows a system to combine the positional accuracy of a slow sensor with the speed and/or acceleration data of the fast system to provide accurate data at low latency.

Several sensor fusion techniques are commonly available. A skilled person knows which techniques are suitable for applying in the method of the present invention; and he can find out how to apply them by routine testing and without exerting inventive effort. For example, the sensor fusion utilizes a class of algorithms that is known as Kalman filters.

A method of the invention can advantageously be used in a range of applications, generally yielding a reduced latency as explained above. It is in particular advantageous in the case of handheld autostereoscopic display devices. This is because such devices are subject to intense movement, especially to rotations. The latter leads to much more extreme viewer positions, viewer speeds and viewer accelerations relative to the device, than in the case of large, stationary devices. Such movements of handheld autostereoscopic display devices easily cause an impaired three-dimensional view because the latency that is conventionally associated with such devices cannot keep up with the intense movements of the device.

A specific advantage of the use of a head-worn IMU in a method of the invention, is that an orientation of the head, and thus the orientation of a facial characteristic, can be measured faster and with more accuracy. For a camera alone, it is difficult to discriminate between lateral and rotational movement of the head (especially rotations characterized as pitch and yaw). A change in head pose is therefore difficult to detect. A head-worn IMU that is equipped with accelerometers and gyroscopes (and preferably also with magnetometers), however, can accurately measure head rotation. Moreover, such measurement occurs with a lower latency than a measurement by a camera. Thus, a viewer who changes head pose can be tracked more accurately and with lower latency by applying a method according to the invention.

The invention further relates to a tracking system (7) for tracking a facial characteristic of a viewer of an autostereoscopic display device (3), the tracking system (7) comprising

- a tracking camera system (4) configured to obtain first sequential data on the position of the facial characteristic relative to the autostereoscopic display device (3), wherein the first sequential data are obtained at a first latency;
- a secondary tracking system (5) configured to obtain second sequential data on the speed and/or acceleration of the facial characteristic relative to the autostereoscopic display device (3), wherein the second sequential data are obtained at a second latency, the second latency being lower than the first latency;
- a sensor fusion module (6) that is configured to combine the first sequential data and the second sequential data to generate final sequential data on the position of the facial characteristic relative to the autostereoscopic display device (3).

In such device, a method of the invention as described above can be carried out. The tracking camera system (4) is configured to obtain the first sequential data and the secondary tracking system (5) is configured to obtain the second sequential data. The final sequential data are available at a final latency that is lower than the first latency.

In a preferred embodiment, the secondary tracking system (5) is designed to be worn on the viewer's head and comprises one or more accelerometers and usually also one or more measuring instruments selected from the group of gyroscopes and magnetometers. This allows to measure the speed and/or acceleration of a person's head, including its rotation, and ultimately that of a particular facial characteristic.

In another preferred embodiment, the secondary tracking system (5) is designed to be not worn on a person's head but to measure the speed and/or acceleration of the facial characteristic from an external position, i.e. a position that is not directly linked or associated with the head of the viewer. To this end, the secondary tracking system (5) typically comprises a remote device configured to measure speed and/or acceleration of the facial characteristic relative to the remote device by means of irradiating the facial characteristic with electromagnetic radiation or sound, for example by making use of the Doppler effect (in light or sound), time of flight or triangulation. Such remote device may be (rigidly) connected to the autostereoscopic display device (3) or may be present at a different location that is not subject to movement of the autostereoscopic display device (3); and thus neither to movement of the viewer.

The invention further relates to an autostereoscopic display device (3) comprising a tracking system (7) as described here above.

The invention further relates to an assembly (8) comprising an autostereoscopic display device (3) and a tracking system (7) as described here above.

Figure 2:
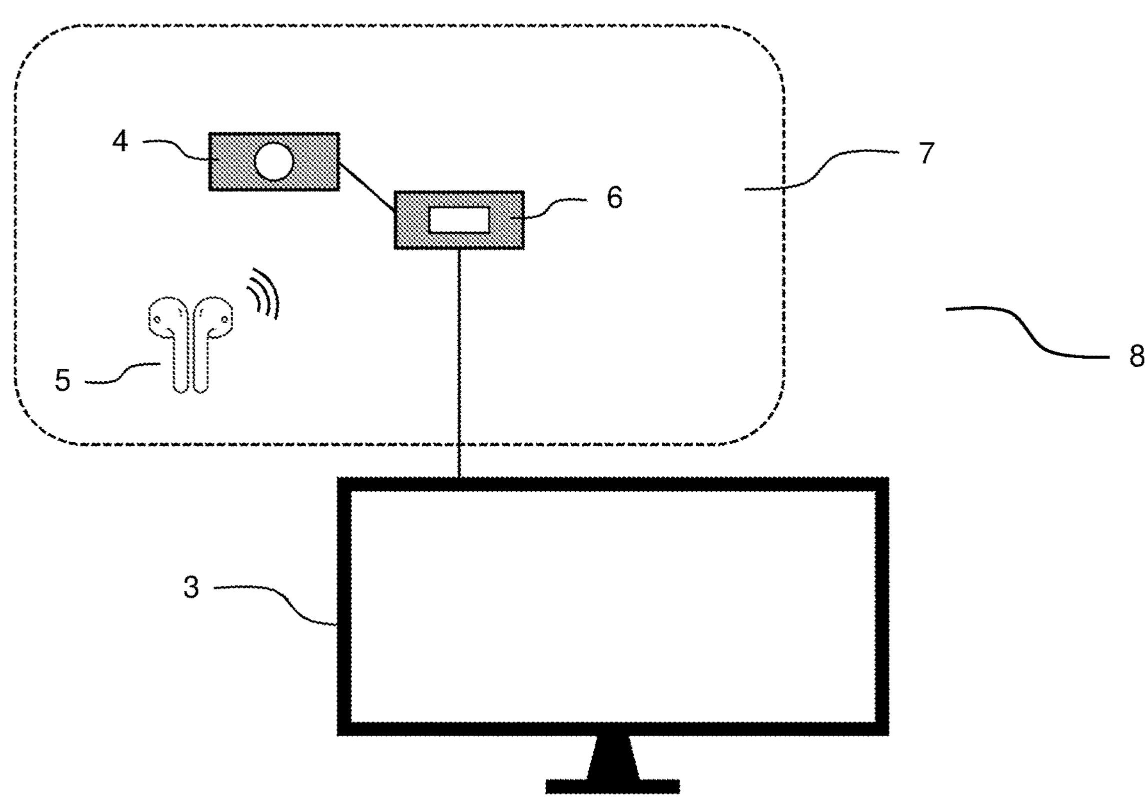
FIG. 2 schematically displays a first assembly (8) according to the invention.

FIG. 2 schematically displays a first assembly (8) according to the invention. It is composed of an autostereoscopic display device (3) and a tracking system (7). The latter is composed of a tracking camera system (4), a secondary tracking system (5) and a sensor fusion module (6). The secondary tracking system (5) comprises a set of earbuds, worn by the viewer of the autostereoscopic display device (3). The earbuds capture data on the speed and/or acceleration of the head of the viewer and communicates wireless with the secondary tracking system (5).

Figure 3:
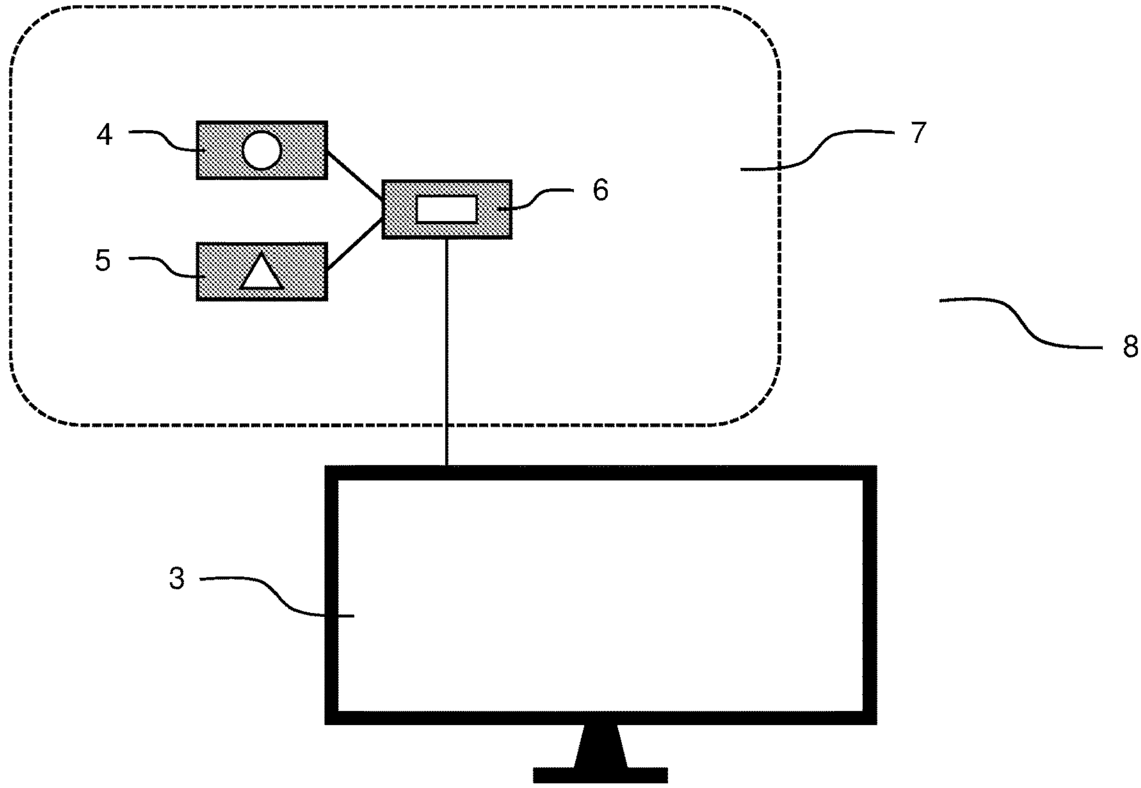
FIG. 3 schematically displays a second assembly (8) according to the invention.

FIG. 3 schematically displays a second assembly (8) according to the invention. It is composed of an autostereoscopic display device (3) and a tracking system (7). The latter is composed of a tracking camera system (4), a secondary tracking system (5) and a sensor fusion module (6). The secondary tracking system (5) comprises a remote device which is not worn by the viewer of the autostereoscopic display device (3) and which is therefore not subject to movement of the viewer (as the device is not worn by the viewer it is identified as being remote from the viewer). In FIG. 3, the secondary tracking system (5) is integrated with the autostereoscopic display device (3); it is rigidly connected to the autostereoscopic display device (3) and so lacks the possibility to move relatively to it; i.e. it is subject to movements of the autostereoscopic display device (3).

In another embodiment (not shown), the secondary tracking system (5) may be physically disconnected from the autostereoscopic display device (3), causing that it is not subject to movements of the autostereoscopic display device (3).

The autostereoscopic display device (3) may be selected from the group of televisions, (desktop) monitors, cinema display systems, mobile phones, tablets, laptops and game consoles.

Preferably, the secondary tracking system (5), in particular the remote device, is integrated in the autostereoscopic display device (3), so that a viewer is involved with only one device when he is presented with content from the autostereoscopic display device (3). This makes viewing more convenient, and allows for the invention to be incorporated into a single handheld autostereoscopic display device (3), such as a mobile phone, a tablet, a laptop or a game console.

When the autostereoscopic display device (3) is handheld, its movement and rotation during use need to be accounted for when performing a method of the invention in the autostereoscopic display device (3). As explained above in the description of the method of the invention, the autostereoscopic display device (3) is therefore preferably configured to produce third sequential data on the speed and/or acceleration of the autostereoscopic display device (3) itself. This would also be necessary when the autostereoscopic display device (3) is present in a moving vehicle such as a car or boat, even when the device in such setting is not handheld.

The invention claimed is:

1. A Method for tracking a facial characteristic of a viewer of an autostereoscopic display device, the method comprising:

obtaining first sequential data on a position of the facial characteristic relative to the autostereoscopic display device, wherein the first sequential data are obtained at a first latency;

obtaining second sequential data on a speed and/or acceleration of the facial characteristic relative to the autostereoscopic display device using a wearable sensor worn by the viewer, wherein the wearable sensor is configured to measure a speed and/or acceleration of the wearable sensor, and wherein the speed and/or acceleration of the facial characteristic is based on a relative positioning of the wearable sensor and the facial characteristic of the viewer, wherein the second sequential data are obtained at a second latency, the second latency being lower than the first latency; and performing sensor fusion to combine the first sequential data and the second sequential data to generate final sequential data on the position of the facial characteristic relative to the autostereoscopic display device, wherein the final sequential data are available at a final latency that is lower than the first latency.

2. The Method according to claim 1, wherein the first sequential data are obtained by using one or more cameras configured to record a facial characteristic of the viewer in an observation field of the one or more cameras.

3. The Method according to claim 1, wherein the second sequential data are obtained by using a wearable device that is worn on the viewer's head, the wearable device including the wearable sensor, wherein the wearable device is configured to produce data on the speed and/or acceleration of the wearable device.

4. The Method according to claim 1, wherein the second sequential data are obtained by taking into account the speed and/or acceleration of the autostereoscopic display device; and the autostereoscopic display device is configured to produce third sequential data on the speed and/or acceleration of the autostereoscopic display device.

5. The Method according to claim 3, wherein the wearable device comprises at least one of earbuds or headphones or glasses or headbands or tiaras or rubber bands or headgear.

6. The Method according to claim 1, further comprising:

obtaining third sequential data on the speed and/or acceleration of the facial characteristic relative to the autostereoscopic display device, wherein the third sequential data are obtained by using a remote device that is not worn on the viewer's head; and performing sensor fusion to combine the first sequential data, the second sequential data, and the third sequential data to generate final sequential data on the position of the facial characteristic relative to the autostereoscopic display device.

7. The Method according to claim 6, wherein the remote device relies on the use of the Doppler effect, triangulation or time of flight.

8. The Method according to claim 1, wherein the facial characteristic comprises at least one of an eye or nose or ear or head or mouth of the viewer.

9. The Method according to claim 1, wherein the autostereoscopic display device comprises at least one of a television or monitor or cinema display system or mobile phone or tablet or laptop or game console.

10. The Method according to claim 1, wherein performing the sensor fusion comprises using a Kalman filter.

11. A Tracking system for tracking a facial characteristic of a viewer of an autostereoscopic display device, the tracking system comprising:

a tracking camera system configured to obtain first sequential data on a position of the facial characteristic relative to the autostereoscopic display device, wherein the first sequential data are obtained at a first latency;

a secondary tracking system configured to obtain second sequential data on a speed and/or acceleration of the facial characteristic relative to the autostereoscopic display device using a wearable sensor worn by the viewer, wherein the wearable sensor is configured to measure a speed and/or acceleration of the wearable sensor, and wherein the speed and/or acceleration of the facial characteristic is based on a relative positioning of the wearable sensor and the facial characteristic of the viewer, wherein the second sequential data are obtained at a second latency, the second latency being lower than the first latency; and a sensor fusion module that is configured to combine the first sequential data and the second sequential data to generate final sequential data on the position of the facial characteristic relative to the autostereoscopic display device.

12. The Tracking system according to claim 11, wherein the secondary tracking system comprises a wearable device that includes the wearable sensor and comprises one or more accelerometers.

13. The Tracking system according to claim 11, wherein the secondary tracking system comprises a remote device configured to measure speed and/or acceleration of the facial characteristic relative to the remote device by irradiating the facial characteristic with electromagnetic radiation or sound, and using one or more of the Doppler effect, time of flight or triangulation.

14. An Assembly comprising:

an autostereoscopic display device; and the tracking system according to claim 11.

15. The Assembly according to claim 14, wherein the secondary tracking system comprises a remote device configured to measure speed and/or acceleration of the facial characteristic relative to the remote device by irradiating the facial characteristic with electromagnetic radiation or sound, wherein the remote device is integrated in the autostereoscopic display device.

16. The Assembly according to claim 14, wherein the autostereoscopic display device is configured to produce third sequential data on the speed and/or acceleration of the autostereoscopic display device.

17. The Tracking system according to claim 12, wherein the wearable device comprises a gyroscope and/or a magnetometer.

18. A Tracking system for tracking a facial characteristic of a viewer of an autostereoscopic display device, the Tracking system comprising:

a tracking camera system configured to capture images of the facial characteristic of the viewer to obtain first sequential data on a position of the facial characteristic relative to the autostereoscopic display device, wherein the first sequential data are obtained at a first latency;

a remote device that is not worn on the viewer, the remote device configured to obtain second sequential data on a speed and/or acceleration of the facial characteristic relative to the remote device by providing an electromagnetic signal or sound signal toward the facial characteristic and measuring a return signal using one or more of the Doppler effect, time of flight, or triangulation, wherein the second sequential data are obtained at a second latency, the second latency being lower than the first latency; and a sensor fusion module configured to combine the first sequential data and the second sequential data to generate final sequential data on the position of the facial characteristic relative to the autostereoscopic display device.

19. The Tracking system according to claim 18, comprising:

a wearable sensor worn by the viewer, wherein:

the wearable sensor is configured to obtain third sequential data, and the sensor fusion module is configured to combine the first sequential data, the second sequential data, and the third sequential data to generate final sequential data on the position of the facial characteristic relative to the autostereoscopic display device.

20. The Tracking system according to claim 18, wherein the remote device and the autostereoscopic display device are substantially stationary with respect to Earth.

* * * * *